United States Patent
Jiang et al.

(10) Patent No.: US 7,728,502 B2
(45) Date of Patent: Jun. 1, 2010

(54) FIELD EMISSION DISPLAY DEVICE AND CATHODE PLATE THEREOF

(75) Inventors: Liang-You Jiang, Danshuei Township, Taipei County (TW); Yu-Yang Chang, Jhudong Township, Hsinchu County (TW); Lih-Hsiung Chan, Kaohsiung (TW)

(73) Assignee: Industrial Technology Research Institute, Hsinchu (TW)

( * ) Notice: Subject to any disclaimer, the term of this patent is extended or adjusted under 35 U.S.C. 154(b) by 757 days.

(21) Appl. No.: 11/386,538

(22) Filed: Mar. 21, 2006

(65) Prior Publication Data

US 2007/0164648 A1    Jul. 19, 2007

(30) Foreign Application Priority Data

Jan. 13, 2006    (TW) .............................. 95101419 A

(51) Int. Cl.
*H01J 1/62* (2006.01)

(52) U.S. Cl. .................. 313/495; 313/310; 430/311

(58) Field of Classification Search ................ 313/310; 430/311–315

See application file for complete search history.

(56) References Cited

U.S. PATENT DOCUMENTS

| 6,332,820 | B1 | 12/2001 | Shimamura et al. |
| 6,825,595 | B2 | 11/2004 | Jin et al. ..................... 313/311 |
| 2002/0094494 | A1* | 7/2002 | Chung et al. ................ 430/311 |
| 2005/0067937 | A1 | 3/2005 | Sheu et al. ................... 313/309 |

FOREIGN PATENT DOCUMENTS

| JP | 07-320629 | 12/1995 |
| TW | 200305924 | 11/2003 |
| TW | 1231521 | 4/2005 |

\* cited by examiner

*Primary Examiner*—Nimeshkumar D Patel
*Assistant Examiner*—Mary Ellen Bowman
(74) *Attorney, Agent, or Firm*—J.C. Patents

(57) ABSTRACT

A method for fabricating a cathode plate of a field emission display is disclosed. A patterned electrode layer is formed on a surface of the substrate, and emitters for absorbing a light source are formed on the patterned electrode layer. Next, a dielectric layer is formed over the substrate, and a patterned gate layer is formed on the dielectric layer. Thereafter, a backside exposure process is carried out using the emitters as a mask, and portions of the dielectric layer not masked by the emitters react with a light used in the backside exposure process. Next, portions of the dielectric layer not exposed to the light and portions of the gate layer are removed to form via holes and gate holes.

4 Claims, 3 Drawing Sheets

FIELD EMISSION DISPLAY DEVICE AND CATHODE PLATE THEREOF

CROSS-REFERENCE TO RELATED APPLICATION

This application claims the priority benefit of Taiwan application serial no. 95101419, filed on Jan. 3, 2006. All disclosure of the Taiwan application is incorporated herein by reference.

BACKGROUND OF THE INVENTION

1. Field of the Invention

The present invention relates to a display and a cathode plate thereof and a method for fabricating the same, and more particularly to a field emission display and a cathode plate thereof and a method for fabricating the same.

2. Description of Related Art

The field emission display has the advantages of light weight, low electric power consumption, no parallax etc.; therefore, currently it has become a widely researched topic. In the field emission display, the distance between the emitter and the gate, and the alignment of the emitters with via holes and gate holes are important factors for the field emission current uniformity of the field emission element pixels. In the prior process, the structure alignment is achieved through photolithography processes step-by step. The deviation will finally be significantly large, because of the alignment error and the deforming affect due to high temperature sintering, such that the via hole and the gate hole cannot be aligned with the emitter, and thereby the field emission uniformity of the element is affected.

SUMMARY OF THE INVENTION

In view of this, the present invention is to provide a cathode plate of a field emission display and method for fabricating the same, wherein a built-in alignment mask is employed to obtain via holes and gate holes with high alignment accuracy.

The present invention is also to provide a cathode plate of a field emission display and a method for fabricating the same, which can simplify the process and reduce the fabrication cost, and improve the field emission uniformity of the element.

The present invention provides a method for fabricating the cathode plate of a field emission display. A patterned electrode layer is formed on a surface of the substrate, and emitters for absorbing a light source are formed on the patterned electrode layer. Next, a dielectric layer is formed over the substrate, and a patterned gate layer is formed on the dielectric layer. Thereafter, a backside exposure process is carried out with the emitters as a mask, and the portions of the dielectric layer exposed by the emitters is exposed to a light source. Afterwards, the portions of the dielectric layer not exposed to the light source and portions of the patterned gate layer are removed to form the gate holes and the via holes exposing the emitters.

According to one embodiment of the present invention, the above emitters comprises a field emission material capable of absorbing UV light source and an additive or a field emission material and an additive capable of absorbing UV light source.

In addition, according to one embodiment of the present invention, the above dielectric layer contains at least one negative photosensitive material, which initiate a cross-linking reaction upon being exposed to a light.

The present invention further provides a method for fabricating the cathode plate of a field emission display, which may include the following steps. A patterned mask layer or absorption layer is formed on a surface of the substrate, and a patterned electrode layer is formed on the mask layer or absorption layer and the substrate. Next, emitters are formed on the patterned electrode layer corresponding to the mask layer or absorption layer. Thereafter, a dielectric layer is formed over the substrate, and a patterned gate layer is formed on the dielectric layer. Afterwards, a backside exposure process is carried out using the patterned mask layer or absorption layer as a mask in order to portions of the dielectric layer exposed to a light source react with the light radiation. Next, portions of the dielectric layer not exposed to the light source and portions of the patterned gate layer are removed to form gate holes and via holes exposing the emitters.

According to one embodiment of the present invention, the mask layers may include Cr, Al, Ag, Ni, and the like. The absorption layer may include titanium oxide, and the like. The emitters may include carbon nanotube, graphite, carbon nanofiber, carbon nanocapsule, diamond-like material, molybdenum, silicon nitride, or zinc oxide. Moreover, the dielectric layer comprises at least one negative photosensitive material which initiate a cross-linking reaction upon being exposed to the light source.

The present invention further provides a cathode plate of the field emission display comprising a substrate, a patterned mask layer or absorption layer on the substrate, a patterned electrode layer, emitters, a dielectric layer, and a patterned gate layer. The patterned electrode layer is located on the patterned mask layer and a portion of the substrate around the patterned mask layer. The dielectric layer covers the patterned electrode layer and the substrate. The dielectric layer has a via hole corresponding to the patterned mask layer and exposing the emitters. The patterned gate layer, disposed on the dielectric layer, has a gate hole corresponding to via holes and exposing the emitters.

According to one embodiment of the present invention, the mask layer may include Cr, Al, Ag, Ni, and the like. The absorption layer may include titanium oxide. The emitters material can may include carbon nanotube, graphite, diamond-like material, molybdenum, silicon nitride or zinc oxide.

In the present invention, an emitter capable of absorbing the light source, such as UV light, or a mask/absorption layer prefabricated under an emitter that cannot absorb UV light are employed as a mask for subsequent process, such that the pattern of the via holes and the gate holes in the fabrication of the field emission element are extremely similar to that of the emitters. Thus, the electron emitting capability of the emitters being induced by the gate may be substantially improved, and the uniformity is also improved. The process steps are decreased.

In order to the make aforementioned and other objects, features and advantages of the present invention comprehensible, preferred embodiments accompanied with figures are described in detail below.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

The present invention employs emitters capable of absorbing the light source, such as the UV light by itself, or a prefabricated masking pattern as a built-in mask for forming via holes and gate holes, so as to obtain via holes and gate holes with a high alignment accuracy, thus the fabrication process is simplified and the fabrication cost is reduced; and the element with a higher field emission uniformity can be obtained.

The detailed processing steps of the present invention will be described as below.

Embodiment One

FIGS. 1A-1D are cross-sectional views of the process steps for fabricating a cathode plate of a field emission display according to one embodiment of the present invention.

Figure 1A:
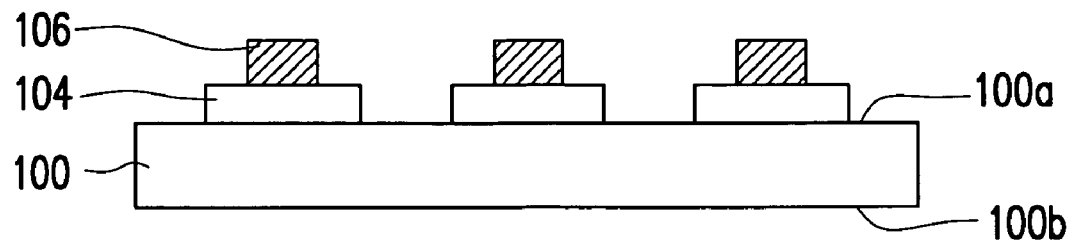
FIGS. 1A-1D are cross-sectional views of the process steps for fabricating a cathode plate of a field emission display according to one embodiment of the present invention.

Referring to FIG. 1A, first, a substrate 100 is provided. The materials of the substrate 100 may comprise, for example, glass. Taking the fabricating process of a 20-inch panel for example, a 20-inch glass (370 mm×470 mm×2.8 mm) plate may be employed as a bottom substrate. Next, a patterned electrode layer 104 is formed on a surface 100a of the substrate 100. In one embodiment, an electrode layer 102 may be coated on the substrate 100 through screen printing process. The materials of the electrode layer 104 may be comprised of a metal layer including, for example, a silver (Ag) electrode layer about 5-10 μm thick. Thereafter, an emitter 106 capable of absorbing a light source, for example, the UV light, is formed on the patterned electrode layer 104. The emitters 106 may include a field emission material capable of absorbing a UV light source, and an additive. The field emission material capable of absorbing a UV light source can be carbon nanotube (CNT), carbon nanocapsule, or graphite carbon nanofiber. The additive may comprise, for example, glass, metal or metal oxide. The metal may include Ag, Pt, Au, and the like. The metal oxide may include indium-tin oxide, tin oxide, and the like. In another embodiment, The emitters 106 may include a field emission material and an additive capable of absorbing a UV light source. The field emission material can use carbon nanotube, carbon nanocapsule, graphite, carbon nanofiber, diamond-like material, molybdenum, silicon nitride, or zinc oxide. The materials of the additive capable of absorbing a UV light source comprise carbon nanoparticle, titanium oxide, gold nanoparticle, and the like. The carbon nanotube or carbon nanocapsule can be formed through arc evaporation, laser ablation of graphite, or chemical vapor deposition (CVD). The emitters 106 may be formed as described below. For example, a slurry containing carbon nanotube (CNT) is formed which is then used to form a patterned CNT layer on the patterned electrode layer 104 via a screen printing process, or a catalyst is formed on the patterned electrode layer 104, such that the carbon nanotube is directly formed on the electrode layer.

Figure 1B:
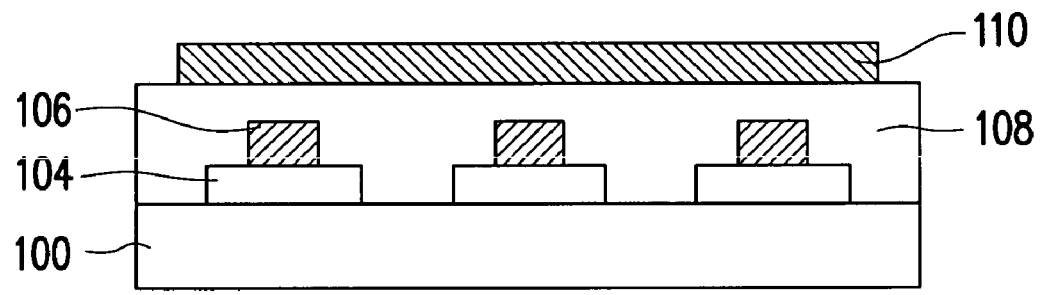

Thereafter, referring to FIG. 1B, a dielectric layer 108 is formed over the substrate 100. The materials of the dielectric layer 108 comprise, for example, silicon nitride containing at least one negative photosensitive material, which may be formed by, for example, preparing a slurry containing the silicon nitride and the negative photosensitive material and then coating the slurry on the substrate 100. Next, a patterned gate layer 110 is formed on the dielectric layer 108. The gate layer 110 material can use, for example, metal such as Au or Ag.

Figure 1C:
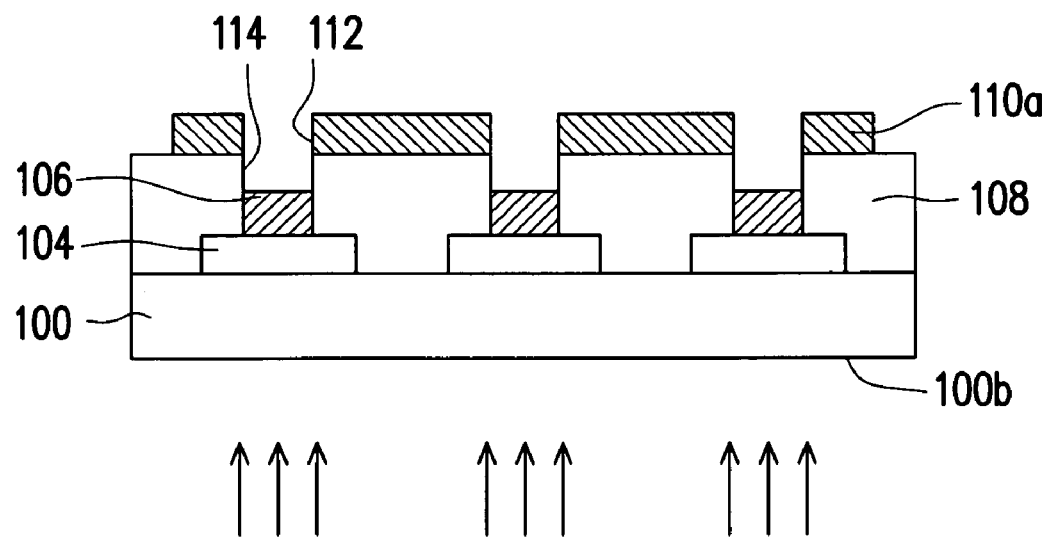

Next, referring to FIG. 1C, a backside exposure process is carried out, using a light source, such as a UV light, from the surface 100b of the substrate 100. Since the emitters 106 can absorb the light used in this exposure process, it can serve as a built-in mask for masking a portions of the dielectric layer 108, and the portions of the dielectric layer 108 not masked by the emitters 106 may react with the UV light. In one embodiment, the materials of the dielectric layer 108 comprises silicon nitride containing at least one negative photosensitive materials capable of initiating a cross-linking reaction after being exposed to the UV light. Thereafter, the portions of the dielectric layer 108 not exposed to the light source and the portions of the patterned gate layer 110 are removed to form a patterned gate layer 110a and form the via holes 114 and the gate holes 112 exposing the emitters 106. In one embodiment, when the materials of the dielectric layer 108 includes silicon nitride, and the materials of the gate layer 110 include Ag, the removing process may be carried out using sodium carbonate solution or similar solutions. Thus, the formation of a cathode plate 10 is completed.

Since the gate holes 112 and via holes 114 are formed by using the emitters 106 serving as the built-in mask, the gate holes 112 and the via holes 114 may formed in a self-aligned manner and are aligned with the emitters 106.

Figure 1D:
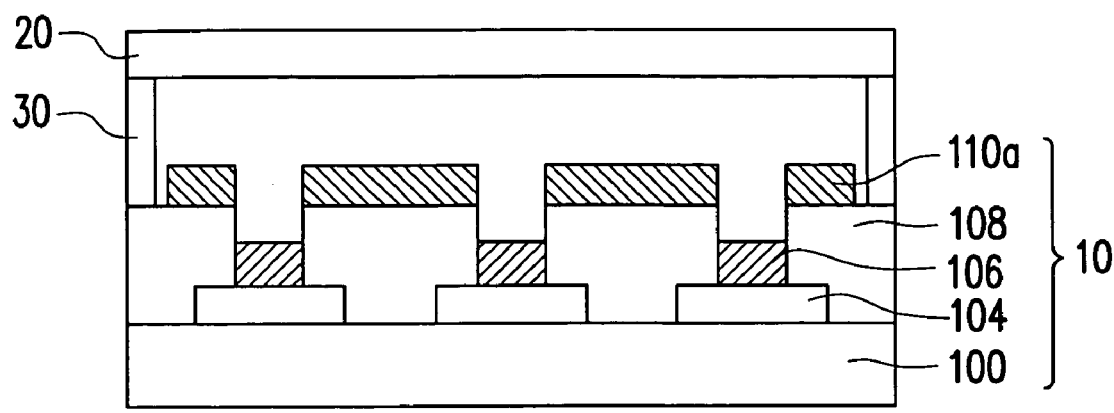

Referring to FIG. 1D, after the cathode plate 10 is formed, an anode plate 20 and a plurality of supporters 30 are provided, wherein the supporters 30 are disposed between the cathode plate 10 and the anode plate 20. Thus, the assembly of the field emission display is completed.

Embodiment Two

FIGS. 2A-2E are cross-sectional views of the process steps for fabricating a cathode plate of a field emission display according to another embodiment of the present invention.

Figure 2A:
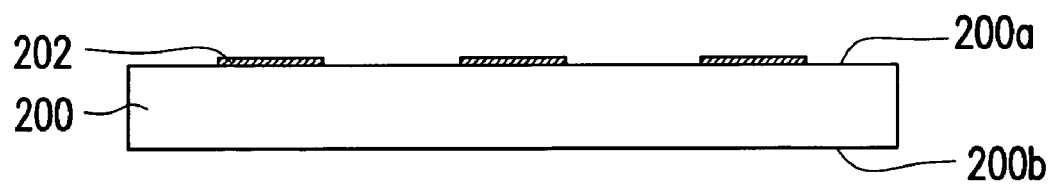
FIGS. 2A-2E are cross-sectional views of the process steps for fabricating a cathode plate of a field emission display according to another embodiment of the present invention.
Figure 2B:
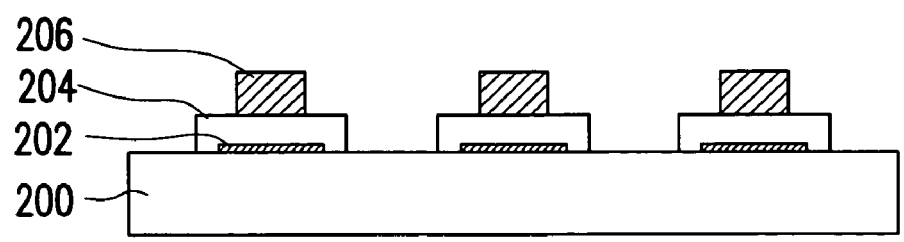

Referring to FIG. 2A, first, a substrate 200 is provided. The materials of the substrate 200 comprise, for example, glass. Next, a patterned mask layer or absorption layer 202 is formed on a surface 200a of the substrate 200. The mask layer 202 may be employed to mask a light source such as a UV light used in a subsequent exposure process. The materials of the mask layer 202 comprise, for example, Cr, Al, Ag, Ni, and the like. The absorption layer 202 can absorb a light source used in a subsequent exposure process, and the material of the absorption layer 202 may includes titanium oxide and the like. Thereafter, a patterned electrode layer 204 and emitters 206 are sequentially formed over the substrate 100. The patterned electrode layer 204 can be coated on the substrate 100 through a screen printing process. The electrode layer 204 can be a metal layer, for example, a silver (Ag) electrode layer, and the thickness is about 5-10 μm. The materials of the emitters 206 comprise, for example, carbon nanotube, graphite, carbon nanofiber, carbon nanocapsule, diamond-like material, molybdenum, silicon nitride, or zinc oxide, and the thickness is about 10-15 μm. The CNT can be formed through arc evaporation, laser ablation of graphic, or CVD. The emitters 206 are formed as described below. For example, a slurry containing the CNT formed by the method described above is prepared and then coated on the patterned electrode layer 204 through screen printing, or a catalyst is formed on the electrode layer 204, such that the carbon nanotube is directly formed on the electrode layer 204.

Figure 2C:
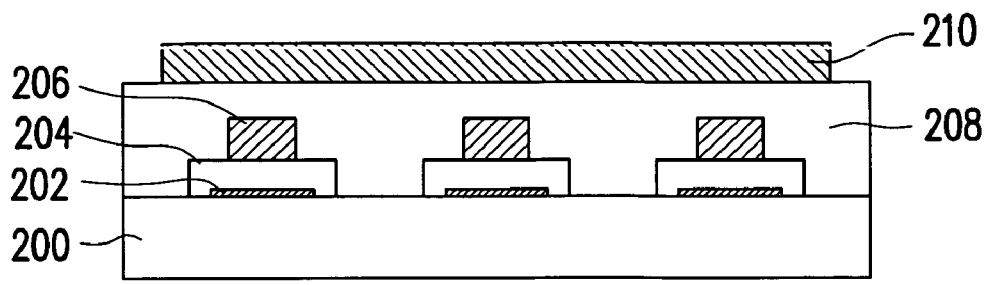

Next, referring to FIG. 2C, a dielectric layer 208 is formed over the substrate 200. The materials of the dielectric layer 208 comprise, for example, silicon nitride containing at least one negative photosensitive material, which is formed by, for example, preparing a slurry containing the silicon nitride and the negative photosensitive material and coating the slurry to cover the substrate 200. Thereafter, a patterned gate layer 210 is formed on the dielectric layer 208. The materials of the gate layer 210 comprise, for example, metal, such as Au or Ag.

Figure 2D:
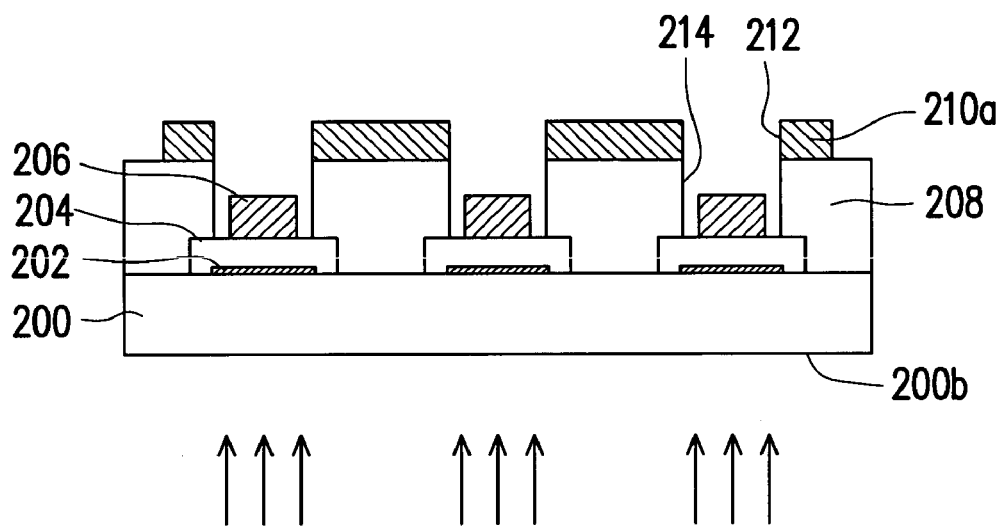

Afterwards, referring to FIG. 2D, a backside exposure process is carried out with a light source, such as a UV light, from the surface 200b of the substrate 200. Since the mask layer 202 can absorb the light source used in this exposure process, it can serve as a built-in mask for masking portions of the dielectric layer 208, and portions of the dielectric layer 208 not masked by the mask layer 202 react with the UV light. In one embodiment, the dielectric layer 208 comprises a silicon nitride layer containing at least one negative photosensitive material capable of initiating a cross-linking reaction after being exposed to the UV light. Next, the portions of the dielectric layer 208 not exposed to the light source are removed, and then the patterned gate layer 210 is removed to form a patterned gate layer 210a and form the via holes 214 and the gate holes 212 that expose the emitters 206. In one embodiment, when the material of the dielectric layer 208 includes silicon nitride, and the gate layer 210 includes an Ag layer, the removing process may be carried by using sodium carbonate solution or similar solutions.

Thus, the formation of a cathode plate 12 is completed. The cathode plate 12 may include the substrate 200, the patterned mask layer 202 on the substrate 200, a patterned electrode layer 204, the emitters 206, the dielectric layer 208, and the patterned gate layer 210a. The patterned electrode layer 204 is located on the patterned mask layer 202 and a portion of the substrate 200 around the patterned mask layer. The emitter 206 is located on the patterned electrode layer 204. The dielectric layer 208 covering the patterned electrode layer 204 and the substrate 200 may include via holes 214 corresponding to the patterned mask layer 202 and exposing the emitters 206. The patterned gate layer 210a is disposed on the dielectric layer 208, and it has gate holes 212 corresponding to the via holes 214 and exposes the emitters 206.

Since the gate holes 212 and the via holes 214 are formed using the mask layer 202 as a built-in mask, the gate hole 212 and the via hole 214 can be self-aligned with the mask layer 202.

Figure 2E:
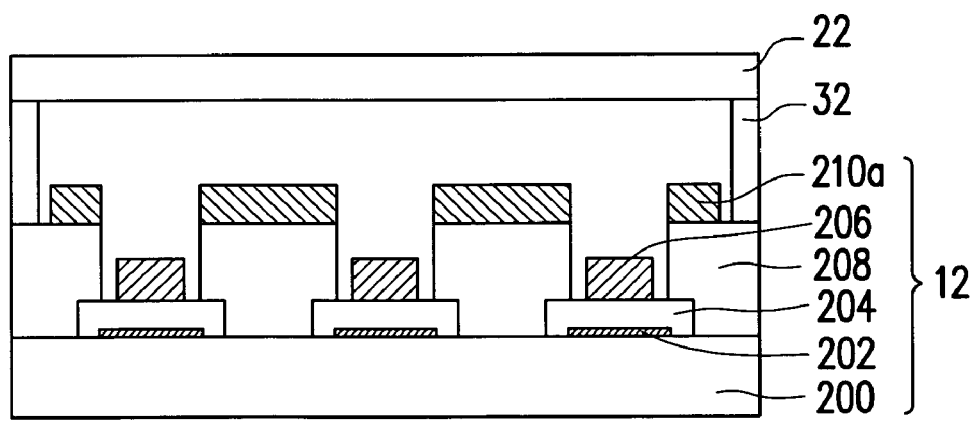

Referring to FIG. 2E, after the cathode plate 12 has been formed, an anode plate 22 and supporters 32 are provided, wherein the supporters 32 are disposed between the cathode plate 12 and the anode plate 22 and adhere the cathode plate 12 and the anode plate 22 together. Thus, the assembly of the field emission display is completed.

The present invention employs the pattern of the emitters capable of absorbing the UV light by itself or the mask layer disposed under the emitters to serve as an alignment mask for forming the via holes and the gate holes so that the overall alignment accuracy may be effectively improved and thereby enable the electron emitting of the field emitter induced by the gate to be more uniform. Furthermore, the method of the present invention has an advantage of being comparatively simple.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A cathode plate of a field emission display, comprising:
   a substrate;
   a patterned mask layer or absorption layer, disposed on a surface of the substrate;
   a patterned electrode layer, covering sidewalls and a top surface of the mask layer and a portion of the substrate around the mask layer;
   a plurality of emitters, respectively disposed on the patterned electrode layer, wherein the entire sidewall surface of each emitter is exposed;
   a dielectric layer, covering a top surface of the patterned electrode layer and the substrate, wherein the dielectric layer has via holes corresponding to the patterned mask layer and exposing the emitters; and
   a patterned gate layer, disposed on the dielectric layer, wherein the patterned gate layer has gate holes corresponding to the via holes and exposing the emitters.

2. The cathode plate of the field emission display as claimed in claim 1, wherein materials of the patterned mask layer comprises Cr, Al, Ag, Ni; and materials of the patterned absorption layer comprises titanium oxide.

3. The cathode plate of the field emission display as claimed in claim 1, wherein the materials of emitters include carbon nanotube, graphite carbon nanofiber, carbon nanocapsule, diamond-like material, molybdenum, silicon nitride or zinc oxide.

4. The cathode plate of the field emission display as claimed in claim 1, wherein a distance between each two adjacent patterned mask layers or absorption layers is equal to a width of the dielectric layer between two corresponding emitters.

* * * * *